(12) United States Patent
Gao et al.

(10) Patent No.: US 7,654,837 B2
(45) Date of Patent: Feb. 2, 2010

(54) CHIP CARD HOLDER AND PORTABLE ELECTRONIC DEVICE USING SAME

(75) Inventors: Yan-Ling Gao, Shenzhen (CN); Hsiao-Hua Tu, Taipei Hsien (TW); Ye Liu, Shenzhen (CN); Jun Wang, Shenzhen (CN); Xu-Ri Zhang, Shenzhen (CN); Wen-Wei Song, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/255,726

(22) Filed: Oct. 22, 2008

(65) Prior Publication Data

US 2009/0269944 A1    Oct. 29, 2009

(30) Foreign Application Priority Data

Apr. 25, 2008    (CN) .................... 2008 1 0301304

(51) Int. Cl.
*H01R 13/62* (2006.01)
(52) U.S. Cl. .................................................. 439/160
(58) Field of Classification Search ................. 439/159, 439/160
See application file for complete search history.

(56) References Cited

U.S. PATENT DOCUMENTS

2008/0132120 A1 *   6/2008   Tsai ........................... 439/630

* cited by examiner

*Primary Examiner*—Ross N Gushi
(74) *Attorney, Agent, or Firm*—Steven M. Reiss

(57) ABSTRACT

An exemplary chip card holder (100) used in a portable electronic device for holding a chip card (50) is provided. The chip card holder includes a housing member (10), a holding member (20), and a driving member (30). The holding member is fixed to the housing member for receiving and holding the chip card. The driving member is movable relative to the housing member and the holding member for moving the chip card from either of a released position and a holding position to the other of the holding position and released position.

14 Claims, 6 Drawing Sheets

CHIP CARD HOLDER AND PORTABLE ELECTRONIC DEVICE USING SAME

BACKGROUND

1. Field of the Invention

The present embodiment relates to a chip card holder for a portable electronic device.

2. Description of Related Art

Portable electronic devices such as mobile phones typically have chip cards (e.g., SIM card) for storing usable information. It is necessary to provide chip card holders for holding/securing the chip card within the portable electronic device.

The chip card holder usually defines a receiving space and a holding member. The chip card can be partially received and held in the receiving space by the holding member. Accordingly, the chip card has an exposed portion which is not received in the receiving space. The exposed portion is used for the removal (e.g., to be pulled by users) of the chip card out of the receiving space. However, the exposed portion is usually too small and therefore difficult for a user to grasp in removing the chip card from the holder.

Therefore, there is room for improvement within the art.

BRIEF DESCRIPTION OF THE DRAWINGS

Many aspects of the exemplary chip card holder can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
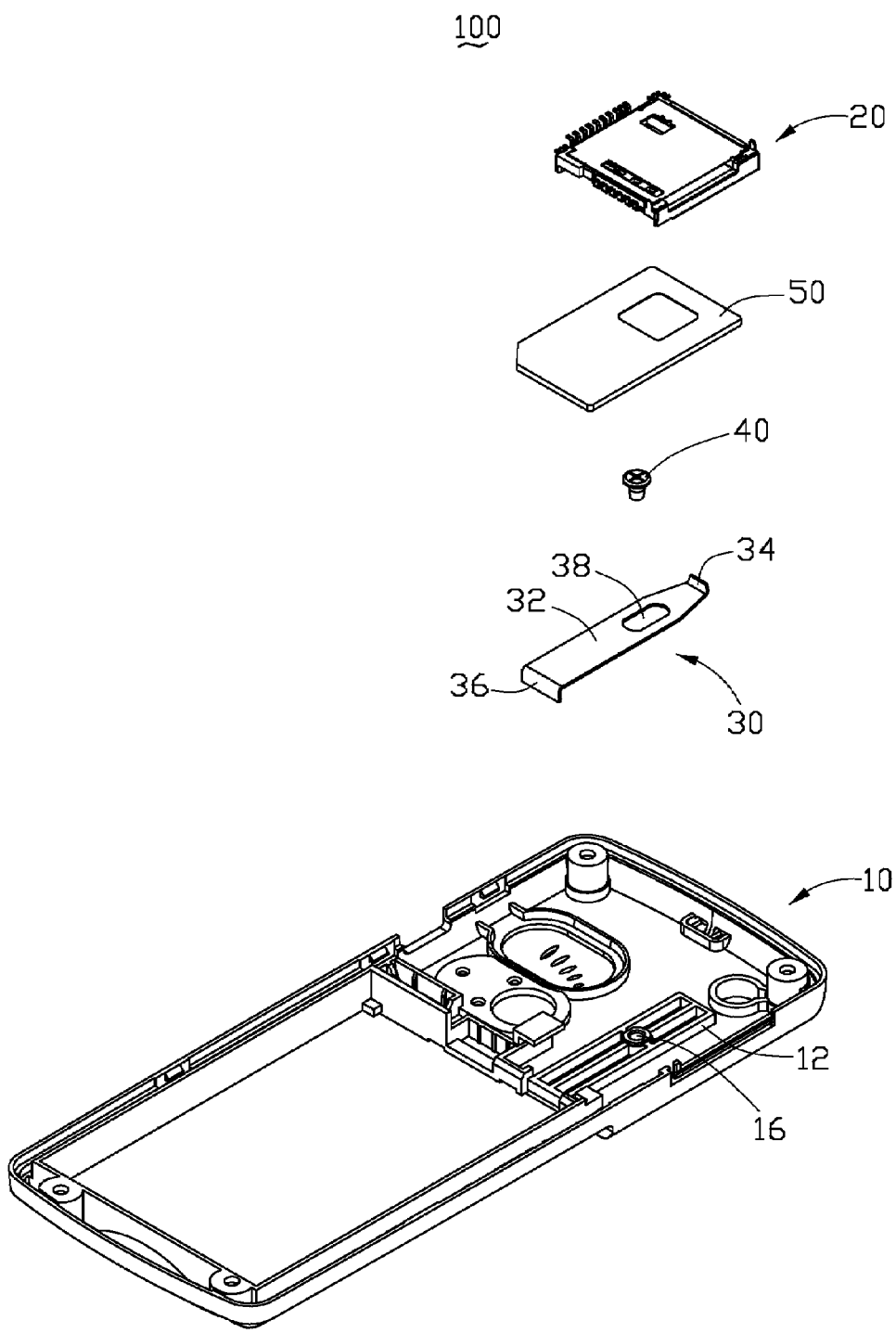
FIG. 1 is an isometric and exploded view of a chip card holder used in a portable electronic device according to an exemplary embodiment.
Figure 2:
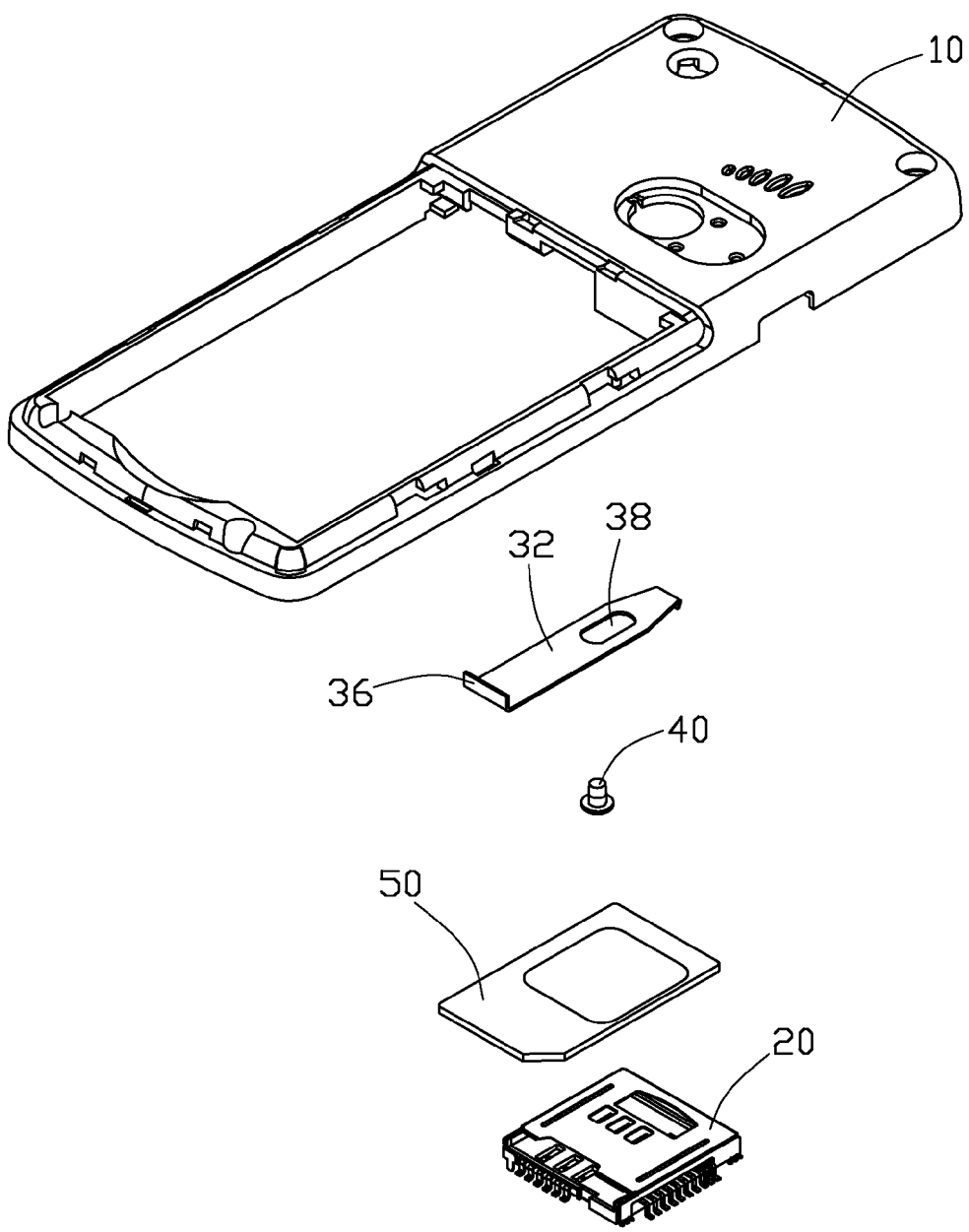
FIG. 2 is similar to FIG. 1, but showing another aspect.

FIGS. 1 and 2 show an exemplary chip card holder 100 for a portable electronic device (e.g., a mobile phone). The chip card holder 100 is used to hold a chip card 50.

The chip card holder 100 includes a housing member 10, a holding member 20, and an driving member 30. The chip card 50 can be received and held by the holding member 20 to a holding position. The driving member 30 is configured to release the chip card 50 from the holding member 20 to a released position.

The housing member 10 may be portions of a housing of the portable electronic device. The housing member 10 forms a securing portion 12 in one end. The securing portion 12 defines a fixing hole 16 in the center. A fixing member 40 corresponds to the fixing hole 16 and secures into the fixing hole 16. The fixing member 40 can be a screw or bolt. Accordingly, the fixing hole 16 can be a threaded hole.

Figure 3:
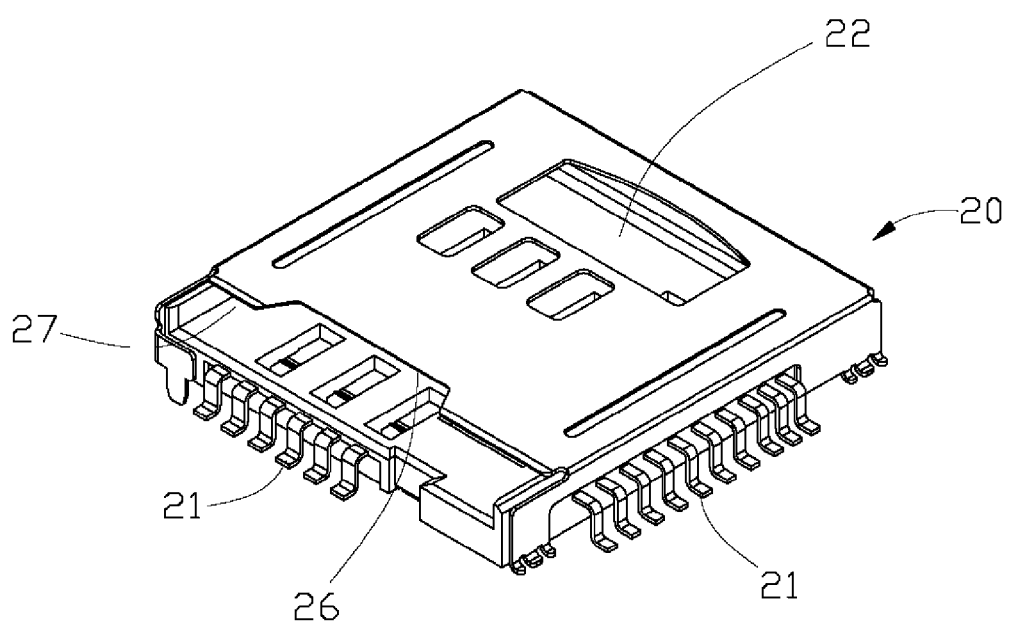
FIG. 3 is an enlarged view of a holding member shown in FIG. 2.

FIG. 3 shows the generally rectangular holding member 20 mounted (e.g., hot-welded) with electrical connector terminal arrays 21. The holding member 20 defines a card chamber 26 and an opening 27. The card chamber 26 corresponds to and receives the chip card 50. The holding member 20 further defines a receiving hole 22 communicating with the card chamber 26. The receiving hole 22 is spaced from the opening 27. The electrical connector terminal arrays 21 have resilient ends extending to inside the card chamber 26. The resilient ends are used to bias and thus hold the chip card 50 within the card chamber 26 and simultaneously electrically connecting the chip card 50 with other electrical components (not shown) within the housing member 10.

Figure 4:
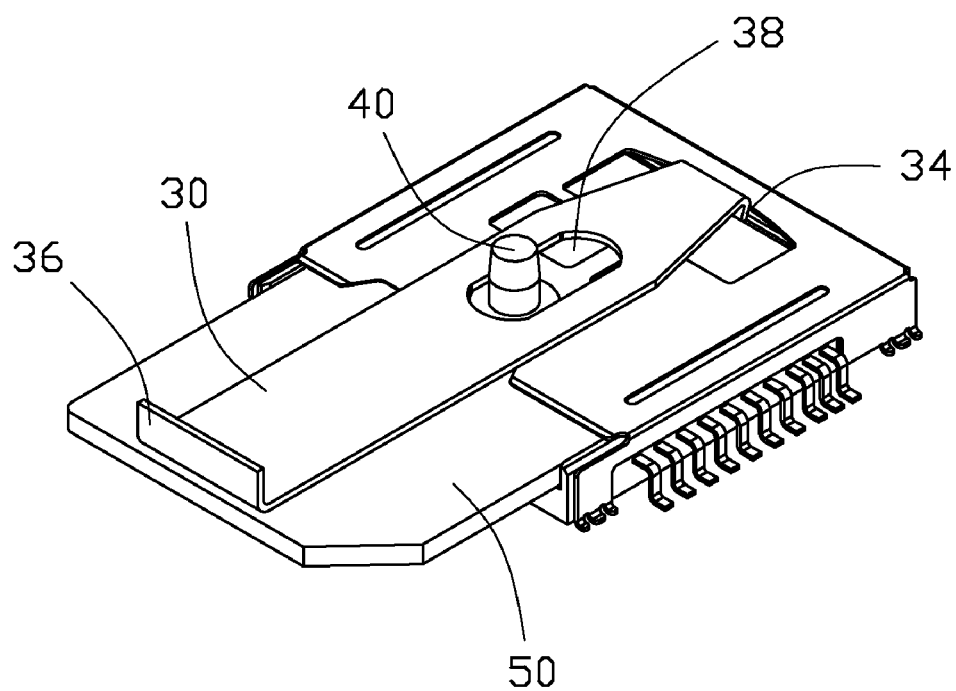
FIG. 4 is a partially assembled view of the chip card holder shown in FIG. 1.
Figure 6:
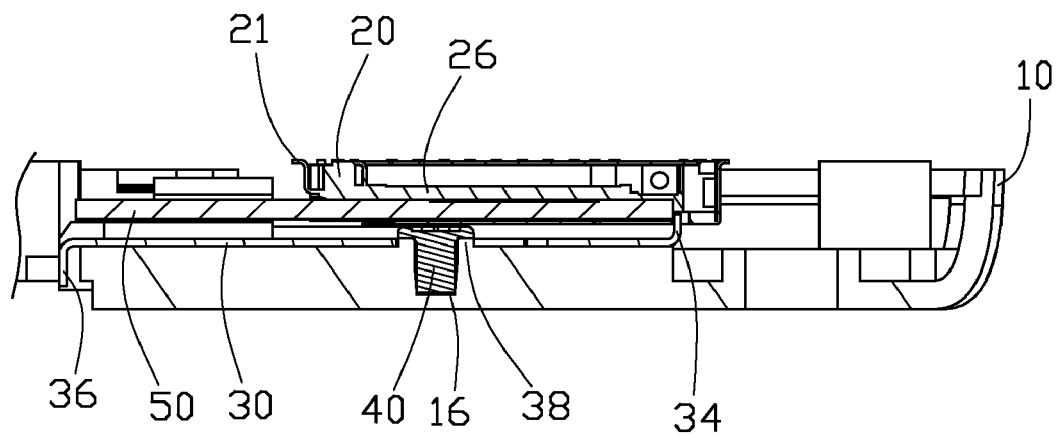
FIG. 6 is a partly cross-sectional view of the chip card holder shown in FIG. 5.

In FIGS. 1 and 2, the driving member 30 is a metallic sheet including a main portion 32, a resisting portion 34, and an operating portion 36. The resisting portion 34 is defined at one end of the driving member 30 and extends towards the housing member 10. The operating portion is defined at the other end of the driving member 30 and extends in an opposite direction than the resisting portion 34 and towards the chip card 50. The main portion 32 defines a guiding hole 38. Referring to FIGS. 4 and 6, the guiding hole 38 corresponds to the fixing member 40 and the fixing hole 16, thereby enabling the fixing member 40 to pass through the guiding hole 38 to be secured into the fixing hole 16. The driving member 30 can move relative to the fixing member 40.

Figure 5:
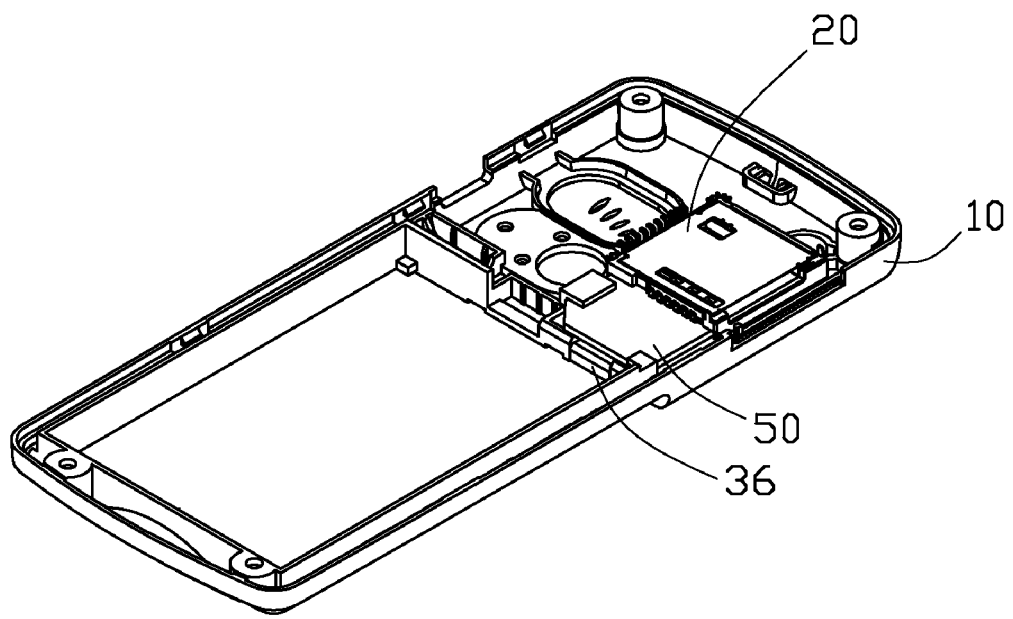
FIG. 5 is an assembled view of the chip card holder shown in FIG. 1 in a holding position.

Referring to FIGS. 4, 5, and 6, the chip card holder 100 is in the holding position. The combination of the holding member 20 and the driving member 30 can be fixed to the housing member 10 by fixing the fixing member 40 into the fixing hole 16 and welding the holding member 20 to the securing portion 12. At this time, the driving member 30 is movably sandwiched between the securing portion 12 and the holding member 20. The resisting portion 34 inserts into the receiving hole 22 and resists against an edge of the chip card 50. The chip card 50 is held within the card chamber 26 by biasing of the electrical connector terminal arrays 21.

To release the chip card 50 from the holding member 20, the driving member 30 is moved away from the holding member 20 by an operator pulling the operating portion 36. Accordingly, the resisting portion 34 moves within the receiving hole 22 toward the opening 27. The fixing member 40 guides the movement of the driving member 30. During this securing portion, the resisting portion 34, contacting an edge of the chip card 50, urges the chip card 50 out of the card chamber 26 by overcoming the biasing of the electrical connector terminal arrays 21.

When either the resisting portion 34 reaches the side of the receiving hole 22 or the fixing member 40 reaches the side of the guiding hole 38, the driving member 30 cannot move further. At this time, most of the chip card 50 is exposed out of the card chamber 26, by which the chip card 50 can be conveniently and completely removed from the holding member 20.

To re-insert the chip card 50 into the holding member 20, the chip card 50 can be moved (e.g., pushed by users) into the card chamber 26. The principle of the re-holding process is similar to the above-described releasing process, but in reverse.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder for holding a chip card, comprising:
a housing member;
a holding member fixed to the housing member and configured for receiving and holding the chip card, the holding member defining a card chamber and a receiving hole communicating with the card chamber;
an driving member movable relative to the housing member and the holding member, and configured for moving the chip card from either of a released position and a holding position to the other of the holding position and released position, the driving member comprising a resisting portion movable inside the receiving hole and configured to contact an edge of the chip card.

2. The chip card holder as claimed in claim 1, wherein the holding member further comprises an electrical connector terminal array, the card chamber being configured for receiving the chip card, and the electrical connector terminal array being configured for maintaining the chip card in the card chamber.

3. The chip card holder as claimed in claim 2, wherein the driving member farther comprises a main portion and an operating portion, and the resisting portion and the operating portion extend in opposite directions from opposite ends of the main portion.

4. The chip card holder as claimed in claim 1, further comprising a fixing member, the housing member defining a fixing hole, the fixing member secured into the fixing hole to secure the driving member between the housing member and the holding member.

5. The chip card holder as claimed in claim 4, wherein the driving member comprises a main portion, the main portion defines a guiding hole, and the fixing member is configured for moving along the guiding hole.

6. The chip card holder as claimed in claim 5, wherein the fixing member is further configured for passing the guiding hole to secure into the fixing hole.

7. The chip card holder as claimed in claim 6, wherein the housing member forms a securing portion, the fixing hole is defined in the securing portion, the holding member is mounted on the securing portion, and the driving member is movably secured between the securing portion and the holding member.

8. A portable electronic device, comprising:
a housing;
a chip card holder for holding a chip card, comprising:
a holding member fixed to the housing and configured for receiving and holding the chip card, the holding member defining a card chamber and a receiving hole communicating with the card chamber;
an driving member movably relative to the housing and the holding member, and configured for moving the chip card from either of a released position and a holding position to the other of the holding position and the released position, the driving member comprising a resisting portion movable inside the receiving hole and configured to contact an edge of the chip card.

9. The portable electronic device as claimed in claim 7, wherein the holding member comprises an electrical connector terminal array, the card chamber being configured for receiving the chip card, and the electrical connector terminal array being configured for maintaining the chip card in the card chamber.

10. The portable electronic device as claimed in claim 9, wherein the driving member further comprises a main portion and an operating portion, and the resisting portion and the operating portion extend in opposite directions from opposite ends of the main portion.

11. The portable electronic device as claimed in claim 8, further comprising a fixing member, the housing defining a fixing hole, the fixing member secured into the fixing hole to secure the driving member between the housing and the holding member.

12. The portable electronic device as claimed in claim 11, wherein the driving member comprises a main portion, the main portion defines a guiding hole, and the fixing member is configured for moving along the guiding hole.

13. The portable electronic device as claimed in claim 12, wherein the fixing member is farther configured for passing the guiding hole to secure into the fixing hole.

14. The portable electronic device as claimed in claim 13, wherein the housing forms a securing portion, the fixing hole is defined in the securing portion, the holding member is mounted on the securing portion, and the driving member is movably secured between the securing portion and the holding member.

* * * * *